(12) United States Patent
Gutknecht et al.

(10) Patent No.: US 6,318,434 B1
(45) Date of Patent: *Nov. 20, 2001

(54) TIRE BUILDING DRUM WITH TURN-UP APPARATUS

(75) Inventors: Heinz Gutknecht, Epe; Franciscus Cornelis Bierens, Vaassen, both of (NL)

(73) Assignee: VMI EPE Holland B.V. (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/380,561
(22) PCT Filed: Jul. 22, 1997
(86) PCT No.: PCT/NL97/00435
 § 371 Date: Sep. 2, 1999
 § 102(e) Date: Sep. 2, 1999
(87) PCT Pub. No.: WO98/52740
 PCT Pub. Date: Nov. 26, 1998

(30) Foreign Application Priority Data
May 23, 1997 (NL) .................................... PCT/NL97/00290

(51) Int. Cl.[7] .................................................. B29D 30/32
(52) U.S. Cl. .......................................... 156/402; 156/414
(58) Field of Search .................................. 156/402, 132, 156/414–426

(56) References Cited

U.S. PATENT DOCUMENTS

| | | | |
|---|---|---|---|
| 3,692,605 | 9/1972 | Cantarutti | 156/132 |
| 3,887,423 | * 6/1975 | Gazuit | 156/402 |
| 4,131,500 | 12/1978 | Wilde et al. | |
| 4,362,592 | 12/1982 | Ruppel | |
| 5,181,982 | 1/1993 | Kumagai et al. | |
| 5,500,066 | 3/1996 | Remond | |
| 5,660,677 | 8/1997 | Remond | |
| 5,706,770 | 1/1998 | Schmidt et al. | 123/90.39 |

FOREIGN PATENT DOCUMENTS

| | | |
|---|---|---|
| 216895 | 11/1982 | (CZ) . |
| 216897 | 11/1982 | (CZ) . |
| 2 124 978 | 12/1971 | (DE) . |
| 4416514 | 11/1994 | (DE) . |
| 0 459 728 | 12/1991 | (EP) . |
| 0 637 505 | 2/1995 | (EP) . |
| 2 294 043 | 7/1976 | (FR) . |
| 1 532 960 | 11/1978 | (GB) . |
| 2 081 189 | 2/1982 | (GB) . |
| 2 182 894 | 5/1987 | (GB) . |
| 1599244 | 10/1990 | (RU) . |
| 717851 | 1/1991 | (SU) . |

* cited by examiner

Primary Examiner—Geoffrey L. Knable
(74) Attorney, Agent, or Firm—Pennie & Edmonds LLP

(57) ABSTRACT

Tire building drum with turn-up apparatus for building an unvulcanized tire with tire components (1, 2) and two bead cores (3, 4) with high bead filling strips (4'). Said drum has two ring segments (6, 7) spaced from each other in order to support a bead core, drum segments (8, 9, 10, 11, 12) placed on the outside of each ring segment in order to support the tire components. Said drum further has means to radially expand that part of the tire components which is situated between the ring segments. Said tire building drum has on both sides outside the ring segments a first and second set of axially extending, hingeable arms (11, 12, 17, 19) each having an end directed to the ring segment, said end having a roller (13, 14, 16, 18) and means to axially and radially move each set of arms from a first position in which the rollers of a set of arms form a virtually closed ring to a second position in order to press the expanded part of the tire components which is situated between the ring segments to the part of the tire components which is situated outside the ring segments. Each roller (16, 18) of an arm (17, 19) of the second set is situated between two adjacent arms (13, 14) of said first set and situated on the side of the rollers of the arms of said first set which side is turned away from the ring segments.

14 Claims, 5 Drawing Sheets

TIRE BUILDING DRUM WITH TURN-UP APPARATUS

BACKGROUND OF THE INVENTION

The present invention relates to a tire building drum with turn-up apparatus for building an unvulcanized tire with tire components of rubber or having reinforcement cords and two bead cores with high bead filling strips, said tire building drum having a central axis, two ring segments placed around the axis and spaced from each other each to support a bead core, drum segments placed around the axis and on the outside of each of the ring segments, which drum segments define a cylindrical surface to support tire components, means to radially expand that part of the tire components which is situated between the ring segments, the tire building drum having on both sides outside the ring segments a first set of axially extending, hingeable arms, each arm having an end directed at the ring segment, said end having a roller, means to axially and radially move each first set of arms from a first position in which the rollers of a first set of arms form a virtually closed ring to a second position in order to press the expanded part of the tire components which is situated between the ring segments to the part of the tire components which is situated outside the ring segments.

Such a tire building drum with turn-up apparatus is already known from British patent specification 1.532.960. This known tire building drum comprises two sets of arms, one set on one side outside of the ring segments and the other set on the other side outside of the ring segments. When moving the arms from the first position to the second position, rollers are brought at a greater distance from the axis, as a result of which the rollers are distanced from each other and thus do not form a virtually closed ring any more. Because the second position is a little distance further from the central axis of the tire building drum than the first position, the part of the tire components situated outside the ring segments is not fully pressed over the total height to the part of the tire components situated between the ring segments, and furthermore the ends of the arms come to stand at a distance from each other so that an incomplete circumferential pressure by the rollers is obtained. In order to prevent an incomplete attachment of the tire components, which may be detrimental to the quality of the tire to be produced, a sleeve of rubber is applied around the arms. Such a sleeve of rubber however, has a limited life span.

SUMMARY OF THE INVENTION

The object of present invention is to provide a tire building drum with turn-up apparatus for building an unvulcanized tire with tire components of rubber or having reinforcement cords and two bead cores with high bead filling strips, wherein without the use of a rubber sleeve the parts of the tire components can be pressed to one another over their full circumference and their full height, so that the final quality of the tire to be produced is improved.

For this purpose a tire building drum with turn-up apparatus of the kind described above is according to the invention characterized in that each first set of arms contains a second set of axially extending, hingeable arms, each arm having an end directed at the ring segment, said end having a roller, each roller of an arm of the second set being situated between two adjacent arms of said first set and being situated on the side of the rollers of the arms of said first set which side is turned away from the ring segments, and that means are provided to axially and radially move each second set of arms from a first position, in which the rollers of a second set of arms form a virtually closed ring to a second position in order to press the expanded part of the tire components which is situated between the ring segments to the part of the tire components which is situated outside the ring segments. Because the rollers of the arms of the second set are situated between the arms of the first set, at least almost the entire circumference of the tire component parts is pressed to one another in the second position of the rollers of both sets, as a result of which an at least almost complete attachment of the tire components is obtained.

A preferred embodiment of a tire building drum with turn-up apparatus according to present invention is characterized in that the means to axially and radially move each first set of arms and the means to axially and radially move each second set of arms are formed by the same means. In this way the turn-up apparatus of the tire building drum cannot only be manufactured in a more compact design, but also moving the sets of arms from the first position to the second position is synchronized in a simple way.

A further preferred embodiment of a tire building drum with turn-up apparatus according to the invention is characterized in that means are provided for laterally supporting the two bead cores with high bead filling strips, wherein the means are situated between the ring segments and preferably are pivotable from a non-working position to a working position. In this way it is prevented that when the arms are going from the first position to the second position, the arms push the bead cores with high bead filling strips from their places. When the means are pivotable from a non-working position to a working position, the normal working of the tire building drum is not detrimentally influenced.

BRIEF DESCRIPTION OF THE DRAWINGS

By way of example, some embodiments of a tire building drum with turn-up apparatus according to the invention will be described on the basis of the drawing. Therein.

DETAILED DESCRIPTION OF THE DRAWINGS

Figure 1:
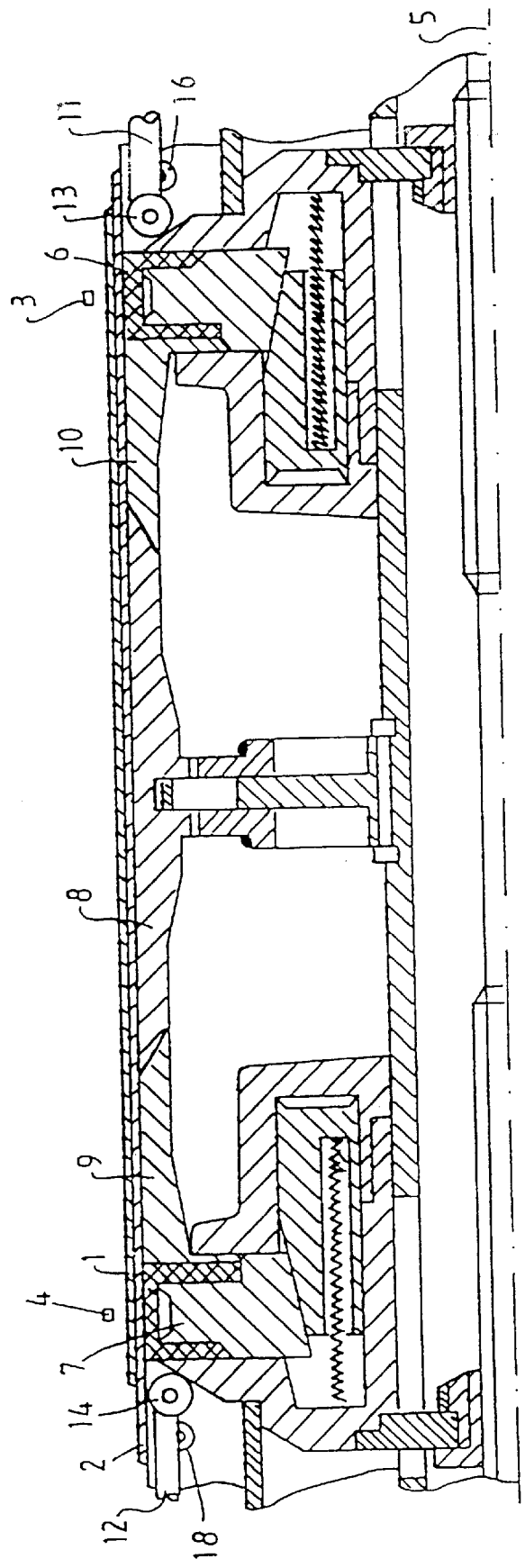
FIG. 1 schematically shows a longitudinal cross section of an tire building drum with turn-up apparatus according to the invention, the arms being in the first position, FIG. 2 schematically shows a longitudinal cross section of an tire building drum wi th turn-up apparatus according to the invention, the arms being in the second position and the part of the tire components which is situated between the ring segments, being expanded, FIG. 3 schematically shows a longitudinal cross section of an alternative embodiment of the tire building drum with turn-up apparatus according to the invention, wherein in the left half of the figure the arms are shown in the first position and in the right half of the figure the arms are shown in the second position, FIG. 4 schematically shows in perspective one set of arms in a first position and some parts of the turn-up apparatus of the tire building drum according to the invention in order to exemplify the three-dimensional configuration, and FIG. 5 schematically shows in perspective one set of arms in a second position and some parts of the turn-up apparatus of the tire building drum according to the invention in order to exemplify the three-dimensional configuration.

FIG. 1 schematically shows a longitudinal cross section of the tire building drum with turn-up apparatus according to the invention for building an unvulcanized tire. Such an unvulcanized tire contains tire components of rubber or having reinforcement cords (of which in FIG. 1 two, 1 and 2 are shown) and two bead cores 3 and 4 with high bead filling strips. The number and kind of tire components are dependent on the final tire to be produced, and the possible assemblies and construction are sufficiently known to an expert, so a more detailed discussion of this will be omitted.

The tire building drum has a central axis 5. Around the the axis 5 and spaced from each other two ring segments 6 and 7 are situated, each to support a corresponding bead core 3 respectively 4. Around the axis 5 and on the outside of each ring segment 6, 7 drum segments formed by arms 11 and 12 are situated, which drum segments define a cylindrical surface to support the tire components 1, 2. The ring segments 6, 7 can also serve to support certain tire components, such as relatively narrow reinforcement strips.

FIG. 1 shows an example of a tire building drum, in this case also with drum segments 8, 9 and 10 between the ring segments. As already known there are means (not represented in the figure) to radially move at least a part of the drum segments (particularly drum segment 8), and means (not represented in the figure) to—for instance by way or air pressure—radially expand that part of the tire components which is situated between the ring segments 3, 4.

The tire building drum on both sides outside the ring segments 6, 7 has a first se: of axially extending, hingeable arms 11 respectively 12. Each arm 11, 12 has an end directed at the ring segment 6, respectively 7, said end having a roller 13, respectively 14. As already known there are means (15, FIG. 2) to axially and radially move each first set of arms 11, 12 from a first position (represented in FIG. 1) in which the rollers 13, 14 of a first set of arms 11, 12 form a virtually closed ring to a second position (represented in FIG. 2) to press the expanded part of the tire components which is situated between the ring segments 6, 7 to the part of the tire components which is situated outside the ring segments 6, 7.

In the following the feature of the tire building drum which is essential for the invention will be further gone into, which is the turn-up apparatus, and other components of the tire building drum, which are sufficiently known to the expert, will not be described in detail.

Figure 2:
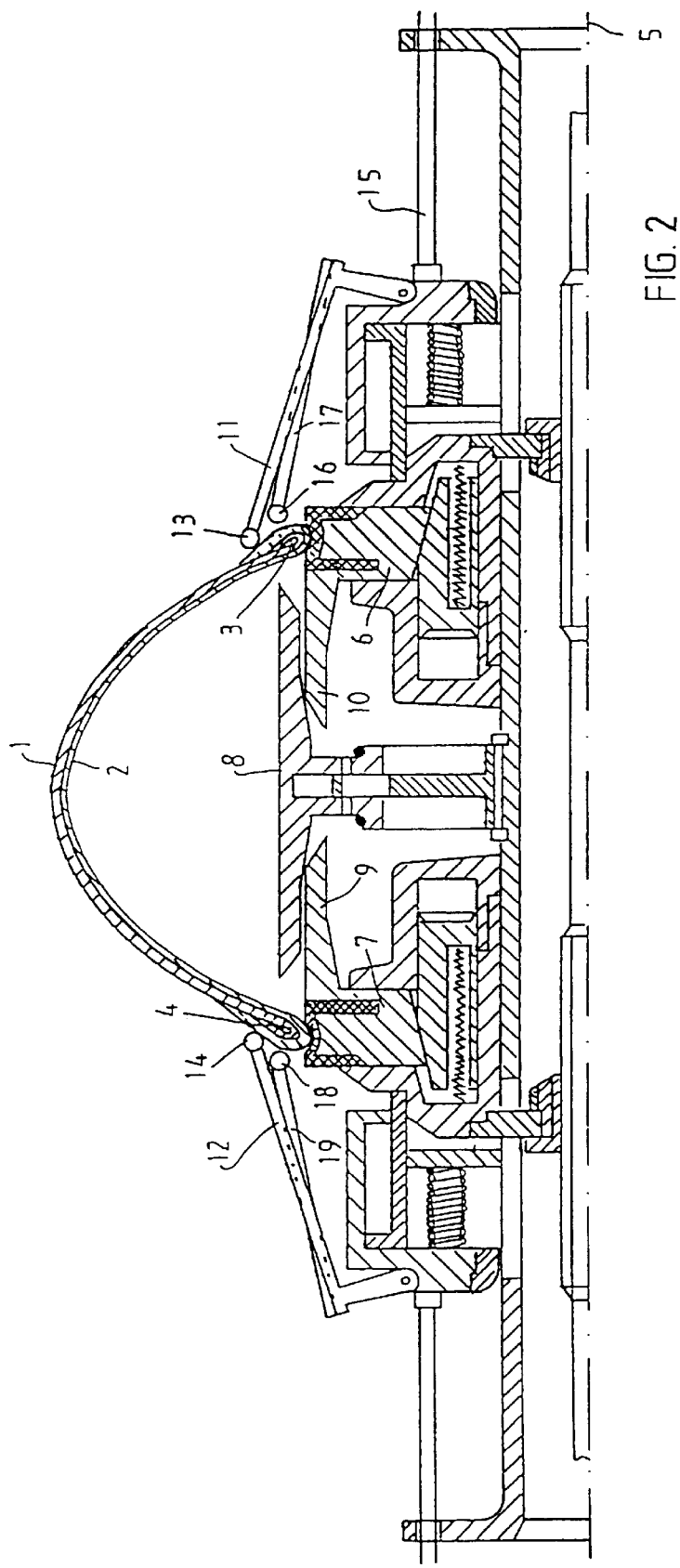
Figure 4:
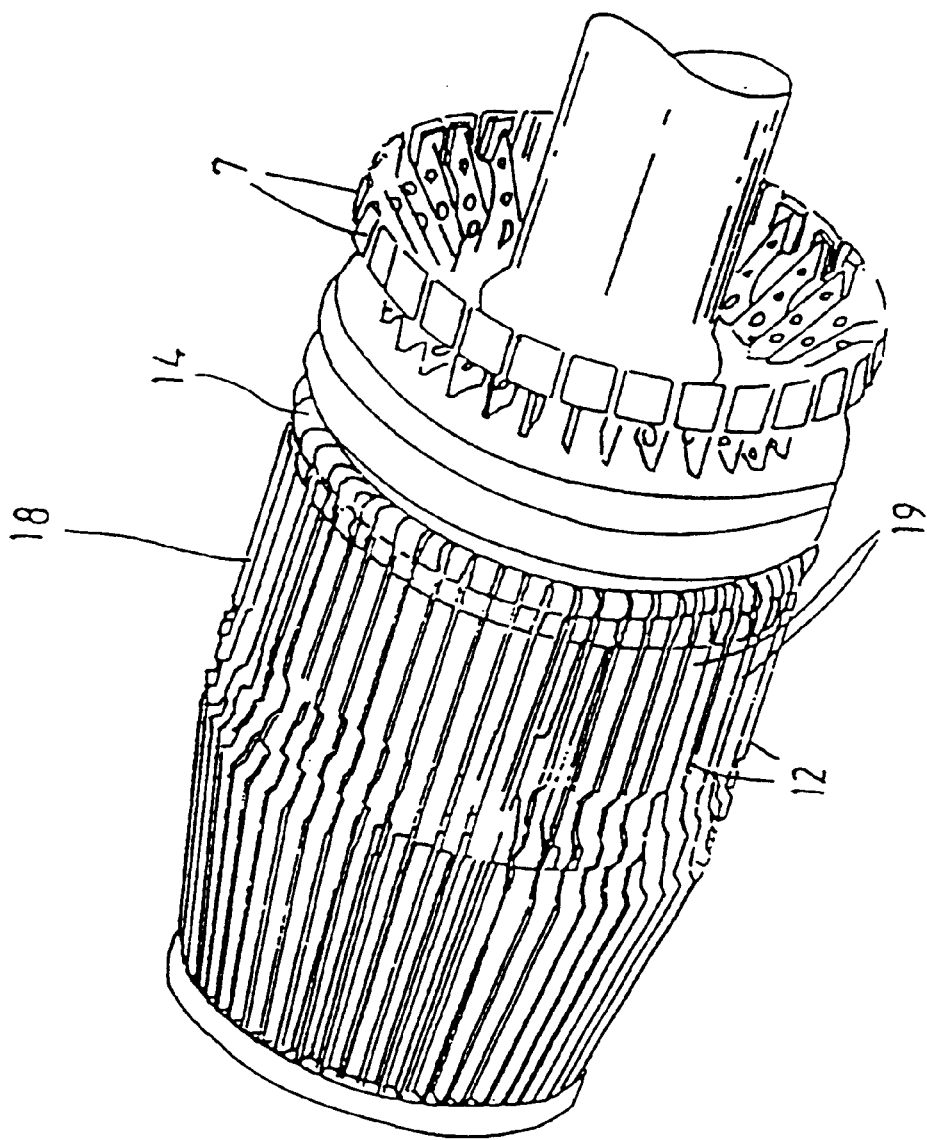

According to the invention a tire building drum with turn-up apparatus is provided in which each first set of arms (11 or 12) contains a second set of axially extending hingeable arms (17 respectively 19, see FIGS. 2 and 4). Each arm 17, 19 of each second set has an end directed at the ring segment 6 respectively 7, said end having a roller 16 respectively 18. Each roller 16, 18 of an arm 17, 19 of each second set is situated between two adjacent arms 11, 12 of the said first set, each roller 16, 18 of the second set being situated on the side of the rollers 13, 14 of the arms 11, 12 of said first set, which side is turned away from the ring segments 6, 7.

Furthermore there are means, preferably the means 15, to axially and radially move each second set of arms from a first position in which the rollers 16, 18 of the second set of arms 17, 19 form a virtually closed ring to a second position in order to press the expanded part of the tire components which is situated between the ring segments 6, 7 to the part of the tire components which is situated outside the ring segments 6, 7. The means to axially and radially move the set of arms preferably comprise flexible bands, arranged around the set of arms in order to press the arms from the second position back to the first position.

Figure 5:
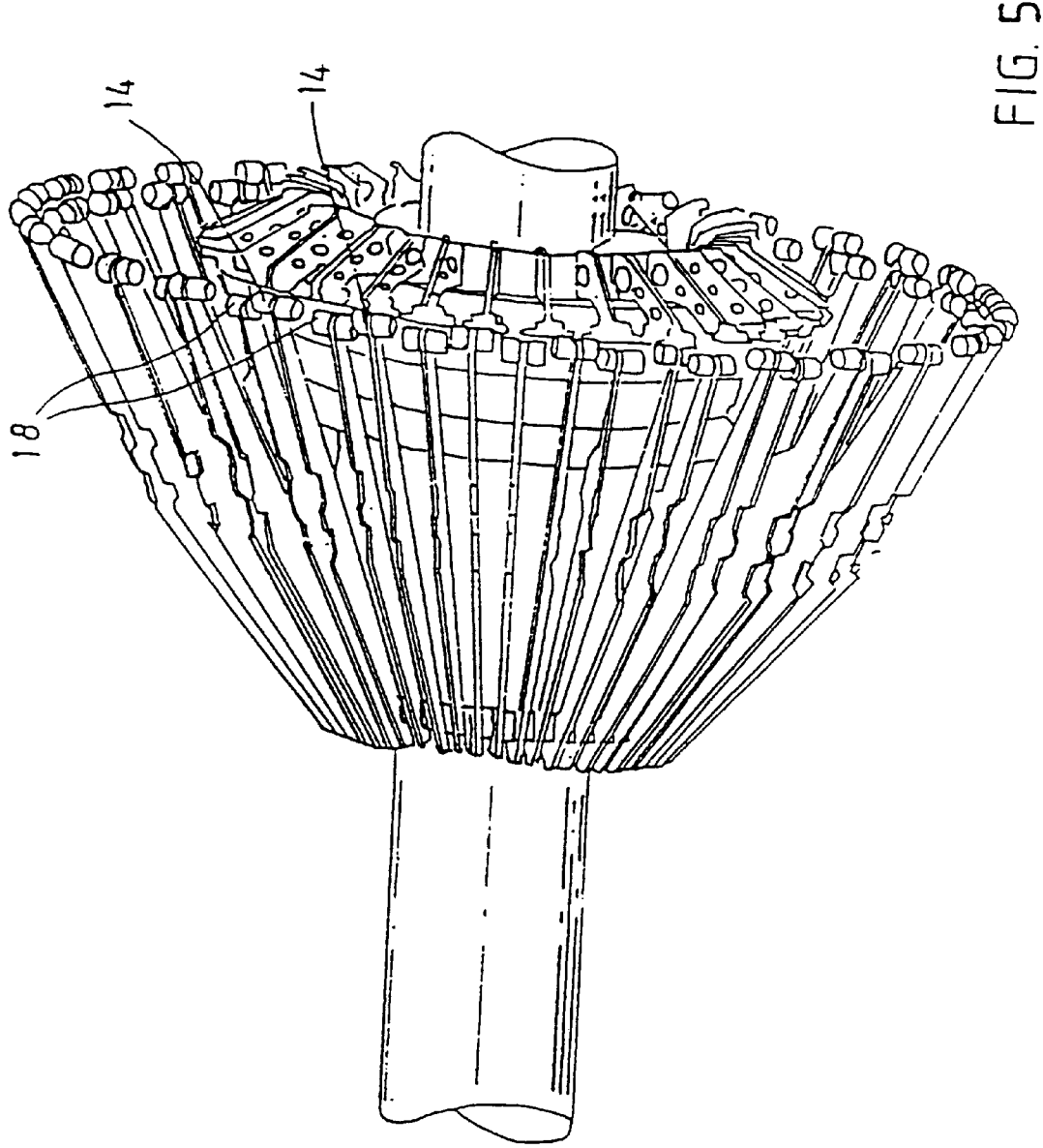

Because the rollers 16, 18 of the arms 17, 19 of the second set are situated between the rollers 13, 14 of the arms 11, 12 of the first set, in the second position of the rollers of both sets almost the entire circumference of the tire component parts is pressed to one another (as represented in FIGS. 2 and 5) as a result of which an almost complete attachment of the tire components is obtained.

Figure 3:
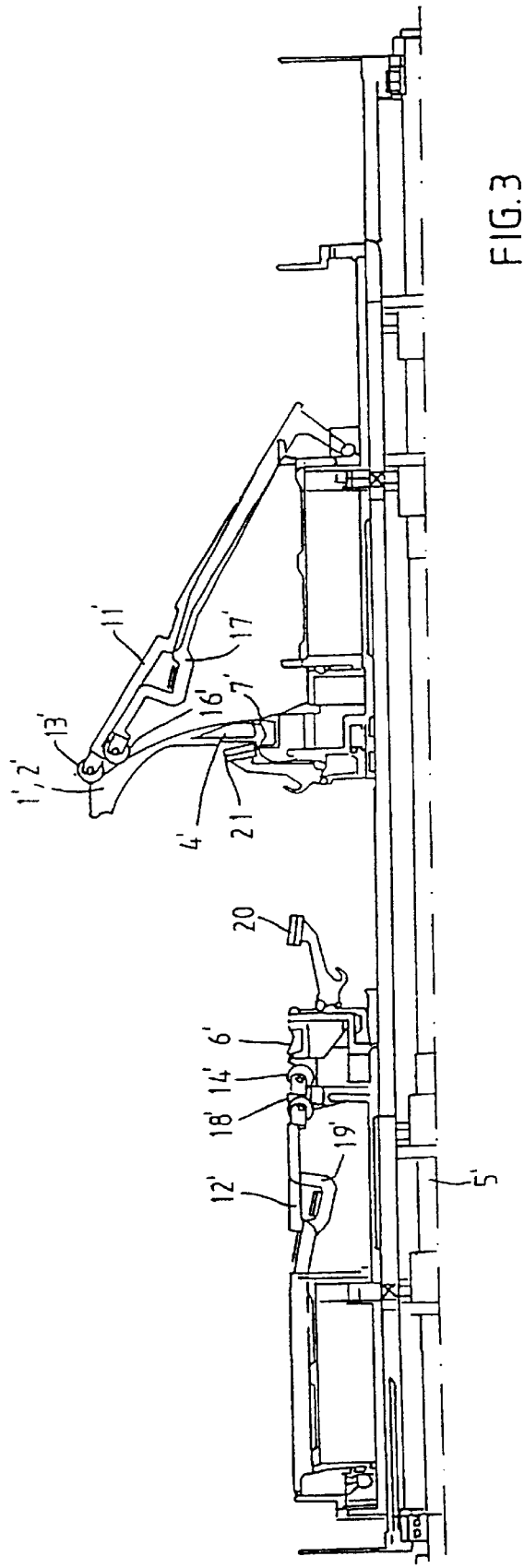

FIG. 3 schematically shows a longitudinal cross section (only the upper half is shown, the lower half is symmetric) of an alternative known embodiment of the tire building drum with turn-up apparatus according to the invention for building an unvulcanized tire. Such an unvulcanized tire consists of tire components of rubber or having reinforcement cords, of which in the right half of FIG. 3, two, 1' and 2', are shown, and two bead cores with high bead filling strips, of which only one 4' is shown. The tire building drum has a central axis 5'. Around the axis 5' and spaced from each other two ring segments 6' and 7' are situated, each to support a corresponding bead core. Ring segments 6' and 7' serve to support the tire components 1' and 2'. Initially two sets of arms 11', 17' and 12', 19' when they are in the first position are used for supporting the part of the tire components that is outside the ring segments. Each arm 11', 12' (17', 19') has an end directed at the ring segment 6', respectively 7', said end having a roller 13', respectively 14' (16', 18'). Each set of arms can be moved from a first position (shown in the left half of FIG. 3) in which the rollers of a set of arms form a virtually closed ring to a second position (shown in the right half of FIG. 3) in order to press the expanded part of the tire components that is between the ring segments 6', 7' to the part of the tire components which is outside the ring segments 6', 7'.

Each roller 16', 18' of an arm 17', 19' of each second set is situated between two adjacent arms 11', 12' of said first set, each roller 16', 18' of the second set being situated on the side of the rollers 13', 14' of the arms 11', 12' of said first set, which side is turned away from the ring segments 6', 7'.

Because the rollers 16', 18' of the arms 17', 19' of the second set are situated between the rollers 13', 14' of the arms 11', 12' of the first set, in the second position of the rollers of both sets, almost the entire circumference of the tire component parts are pressed to one another, wherein also without the use a sleeve of rubber an almost complete attachment of tire component parts is obtained.

Furthermore means 20, 21 (FIG. 3) are provided to laterally support said two bead cores with high bead filling strips of which one 4' is shown in FIG. 3, in which the means are situated between the ring segments 6', 7'. Said means, when in working position, prevent that the arms when going from a first position to a second position, from unwontedly pushing the bead cores with high bead filling strips from the ring segments. Preferably the means 20, 21 for laterally supporting the bead cores with high bead filling strips are pivotable from a non-working position to a working position. In this way the means for laterally supporting the bead cores with high bead filling strips do not impede the normal working of the tire building drum, and moreover can help supporting the tire components in the starting position.

What is claimed is:

1. Tyre building drum with turn-up apparatus for building an unvulcanized tire with tire components of rubber or having reinforcement cords (1, 2; 1',2') and two bead cores (3, 4; 3', 4') with high bead filling strips, said tire building drum having a central axis (5; 5'), two ring segments (6, 7; 6', 7') placed around the axis (5; 5') and spaced from, each other each to support a bead core (3, 4; 3', 4'), drum segments formed by arms (11, 12; 11', 12') placed around the axes (5; 5') and on the outside of each of the ring segments (6, 7; 6', 7'), which drum segments (11, 12; 11', 12') define a cylindrical surface to support tire components, means to radially expand that part of the tire components which is situated between the ring segments, the tire building drum having on both sides outside the ring segments (6, 7; 6', 7') a first set of axially extending, hingeable arms (11, 12; 11', 12'), each arm (11, 12; 11', 12') having an end directed at the ring segment (6, 7; 6', 7'), said end having a roller (13, 14; 13', 14'), means (15; 15') to axially and radially move each first set of arms (11, 12; 11', 12') from a first position in which the rollers (13, 14; 13', 14') of a first set of arms (11, 12; 11', 12') form a virtually closed ring to a second position in order to press the expanded part of the tire components which is situated between the ring segments (6, 7; 6', 7') to the part of the tire components which is situated outside the ring segments (6, 7; 6', 7'), characterized in that, each first set of arms (11, 12; 11', 12') contains a second set of axially extending, hingeable arms (17, 19; 17', 19'), each arm (17, 19; 17', 19') having an end directed at the ring segment (6, 7; 6', 7'), said end having a roller (16, 18; 16', 18'), each roller (16, 18; 16', 18') of an arm (17, 19; 17', 19') of the second set being situated between two adjacent arms (11, 12; 11', 12') of said first set and being situated on the side of the rollers (13, 14; 13', 14') of the arms (11, 12; 11', 12') of said first set, which side is turned away from the ring segments (16, 17; 16', 17'), and that means (15; 15') are provided to axially and radially move each second set of arms (17, 19; 17', 19') from a first position in which the rollers (16, 18; 16', 18') of a second set of arms (17, 19; 17', 19') form a virtually closed ring, to a second position in order to press the expanded part of the tire components which is situated between the ring segments (6, 7; 6', 7') to the part of the tire components which is situated outside the ring segments (6, 7; 6', 7').

2. Tyre building drum with turn-up apparatus according to claim 1, characterized in that, the means (15; 15') to axially and radially move each first set of arms (11, 12; 11', 12') and the means (15; 15') to axially and radially move each second set of arms (17, 9; 17', 19') are formed by the same means (15; 15').

3. Tyre building drum with turn-up apparatus according to claims 1 or 2, characterized in that, means (20, 21) are provided to laterally support the two bead cores (3, 4; 3', 4') with high bead filling strips, wherein the means are situated between the ring segments (6, 7; 6', 7').

4. Tyre building drum with turn-up apparatus according to claim 3, characterized in that the means (20, 21) to laterally support the bead cores (3, 4; 3', 4') with high bead filling strips are pivotable from a non-working position to a working position.

5. A tire building drum, the drum having a central axis and being configured for turning up a turn-up portion of a tire component about a bead core, comprising:

a first support member, the support member disposed radially about the central axis and configured to operably support a portion of the tire component and the bead core; and first and second sets of arms disposed about the central axis, the arms of the second set being interspersed among the arms of the first set, the arms of the first and second sets each having a first end operably associated with the first support member and a second end spaced apart from the first support member along the central axis and pivotably associated with the tire building drum, the arms of the first and second sets each being movable from a resting position to a working position, wherein, in the working position, the first ends of the arms of the first set are disposed at a first radial distance from the central axis and, in the working position, the first ends of the arms of the second set are disposed at a second, smaller radial distance from the central axis, and wherein, upon moving from the resting position to the working position, the first and second sets of arms cooperate to press against substantially the full circumference of the turn-up portion of the tire component.

6. The tire building drum of claim 5, further comprising:

a second support member disposed radially about the central axis and configured to operably support a second portion of the tire component and a second bead core; and third and fourth sets of arms disposed about the central axis, the arms of the fourth set being interspersed among the arms of the third set, the arms of the third and fourth sets each having a first end operably associated with the second support member and a second end spaced apart from the second support member along the central axis and pivotably associated with the tire building drum, the arms of the third and fourth sets each being movable from a resting position to a working position, wherein, in the working position, the first ends of the arms of the third set are disposed at a first radial distance from the central axis and, in the working position, the first ends of the arms of the fourth set are disposed at a second, smaller radial distance from the central axis, and wherein, upon moving from the resting position to the working position, the third and fourth sets of arms cooperate to press against substantially the full circumference of a portion of the tire component turned up about the second bead core.

7. The tire building drum of claim 6, further comprising expansion means to radially expand a portion of the tire component disposed between the first and second support members.

8. The tire building drum of claim 5, wherein, in the resting position, the first ends of the arms of the second set are disposed at a different distance from the first supporting member than the first ends of the arms of the first set to allow the arms of the second set to move from the resting position to the working position without interfering with the second set of arms.

9. The tire building drum of claim 5, wherein consecutive arms of the second set are disposed about an arm of the first set.

10. The tire building drum of claim 5, wherein the first end of each arm of the first and second sets comprises a roller.

11. The tire building drum of claim 5, wherein the tire component comprises at least one of unvulcanized rubber, reinforcing cords, or a high bead filling strip.

12. The tire building drum of claim 5, wherein the turn-up portion has a height and, in the working position, the arms of the first and second sets cooperate to press against substantially the full height.

13. The tire building drum of claim 5, wherein the first support member comprises a radial depression configured to receive a portion of the tire.

14. The tire building drum of claim 5, wherein the first and second sets of arms are configured to move in unison from the first to the second position.

* * * * *